United States Patent
Han

(10) Patent No.: US 10,281,063 B1
(45) Date of Patent: May 7, 2019

(54) PIPE FIXATION APPARATUS

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 15/913,854

(22) Filed: Mar. 6, 2018

(30) Foreign Application Priority Data

Dec. 29, 2017 (TW) .............................. 106219457 U

(51) Int. Cl.
*F16L 3/22* (2006.01)
*F16B 7/04* (2006.01)
*F16L 43/02* (2006.01)

(52) U.S. Cl.
CPC ............ *F16L 3/222* (2013.01); *F16B 7/0433* (2013.01); *F16L 43/02* (2013.01)

(58) Field of Classification Search
CPC .......... F16L 3/222; F16L 43/02; F16B 7/0433
USPC ................ 248/52, 63, 65, 67, 68.1, 73, 74.5
See application file for complete search history.

(56) References Cited

U.S. PATENT DOCUMENTS

| | | | | |
|---|---|---|---|---|
| 5,996,945 A | * | 12/1999 | Coles .................... | F16L 3/2235 24/16 R |
| 7,617,963 B1 | * | 11/2009 | Jensen .................. | F16L 3/1226 228/44.5 |
| 2006/0233513 A1 | * | 10/2006 | Klein ...................... | F16L 3/222 385/147 |
| 2011/0025041 A1 | * | 2/2011 | Birch .................... | F16L 1/0246 285/24 |
| 2012/0222882 A1 | * | 9/2012 | Du ........................... | H02G 1/00 174/68.3 |
| 2014/0158835 A1 | * | 6/2014 | Schneider ................. | F28D 7/06 248/68.1 |
| 2015/0204461 A1 | * | 7/2015 | Ben Jacov .............. | F16L 3/123 138/106 |
| 2016/0305575 A1 | * | 10/2016 | Tajer .................... | H02G 3/0431 |

* cited by examiner

*Primary Examiner* — Muhammad Ijaz
(74) *Attorney, Agent, or Firm* — Leong C. Lei

(57) ABSTRACT

A pipe fixation apparatus includes a main body and a first receiving portion, a second receiving portion, a bending portion, a first fixation portion, a second fixation portion and an attachment portion formed on the main body. During the use the pipe fixation apparatus, the first receiving portion and the second receiving portion of the main body are able to receive a pipe having a flexible portion in order to use the first fixation portion and the second fixation portion for securing the pipe. In addition, the bending portion allows the flexible portion of the pipe to form a bending shape. The attachment portion can be used to allow more than two main bodies to be attached onto each other. Accordingly, the pipe fixation apparatus of the present invention is convenient to use and is able to achieve a neat and appealing arrangement of pipes.

7 Claims, 9 Drawing Sheets

PIPE FIXATION APPARATUS

TECHNICAL FIELD OF THE INVENTION

The present invention is related to a fixation apparatus, in particular, to a pipe fixation apparatus facilitated for use and with neat appearance.

DESCRIPTION OF THE PRIOR ART

Computer cooling methods can be mainly divided into two types of air cooling method and water cooling method, in which the water cooling method is known to have a greater effect than the air cooling method. However, the cooling method requires the use of at least one inlet pipe assembly, at least one outlet pipe assembly, at least one heat exchanger (such as contacting conductive component made of copper or aluminum etc.), at least one pump and at least one temperature cooling device (such as an external fan) etc. for cooperation with each other in order to perform the circulation and convey of cooling water as well as to perform heat exchange for cooling various types pf electronic components. In addition, as the temperature cooling water is able to lower the temperature of the cooling water continuously, the inlet pipe assembly and the outlet pipe assembly are installed to circulate cooling liquid inside the computer. Nevertheless, since there are various types of electronic components inside the computer and may be required to be removed or repaired form time to time, the configuration of the inlet pipe assembly and outlet pipe assembly needs to avoid such electronic components. Currently, most of the known methods use linear rigid pipes and angled connectors in combination to form the inlet pipe assembly and the outlet pipe assembly. However, such configuration is not optimal to the inlet pipe assembly and the outlet pipe assembly as it requires the fastening of the linear rigid pipes and angled connectors one by one, which not only requires significant period of time for the assembly and installation but also the need for purchasing and manufacturing various types of linear rigid pipes of different lengths. For different types and sizes of computers, a great number of linear rigid pipes of different lengths need to be purchased and manufactured, causing the cost of such configuration to be relatively expensive.

SUMMARY OF THE INVENTION

A primary objective of the present invention is to provide a pipe fixation apparatus capable of facilitating the use thereof and to improve the appearance of a neat pipeline arrangement.

To achieve the aforementioned objective, the present invention provides a pipe fixation apparatus comprising at least one main body, at least one first receiving portion formed at one end of the main body, at least one first fixation portion formed on the first receiving portion, at least one second receiving portion formed on one end of the main body away from the first receiving portion, at least one second fixation portion formed on the second receiving portion in order to secure a pipe thereon.

In addition, the main body further includes at least one bending portion formed between the first receiving portion and the second receiving portion, and it is configured to form at least one angle between the first receiving portion and the second receiving portion. Furthermore, the main body further includes at least one attachment portion formed on at least one side of the main body.

To allow the first receiving portion and the second receiving portion to receive the pipe during the use of the pipe fixation apparatus of the present invention during the use of the apparatus, the flexible portion of the pipe is able to form a bending shape along with the angle formed between the first receiving portion and the second receiving portion. In addition, the first fixation portion and the second fixation portion can be used for securing the pipe respectively such that the pipe and the bending portion thereof can be maintained to be in a bending shape. When the quantity of the pipe is plural, then a plurality of the main bodies of the pipe fixation apparatus can be used for fixation respectively. Furthermore, the plurality of main bodies can be attached with each other via the attachment portions formed thereon; therefore, they are extremely convenient to use. Moreover, the pipe fixation apparatus is able to neatly arrange the pipes in order to improve the appealing appearance.

Based on the aforementioned technique of the present invention, the drawbacks of inconvenient use and expensive cost associated with the known linear rigid pipes and angled connectors can be overcome, thereby achieving the advantageous effects of convenient use with neat and appealing appearance.

DETAILED DESCRIPTION OF THE PREFERRED EMBODIMENTS

Figure 1:
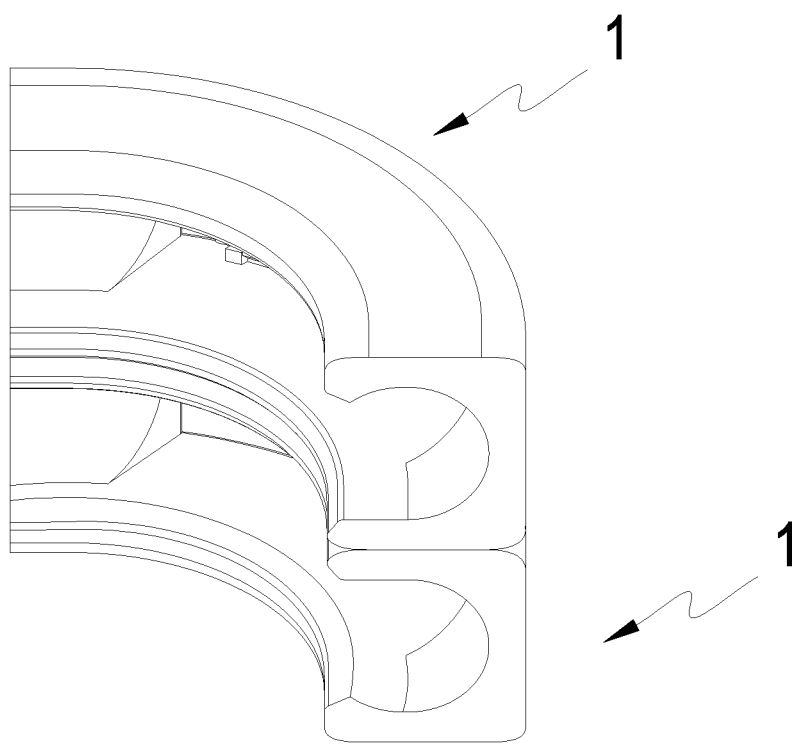
FIG. 1 is a perspective assembly view of a first embodiment of the pipe fixation apparatus of the present invention.
Figure 2:
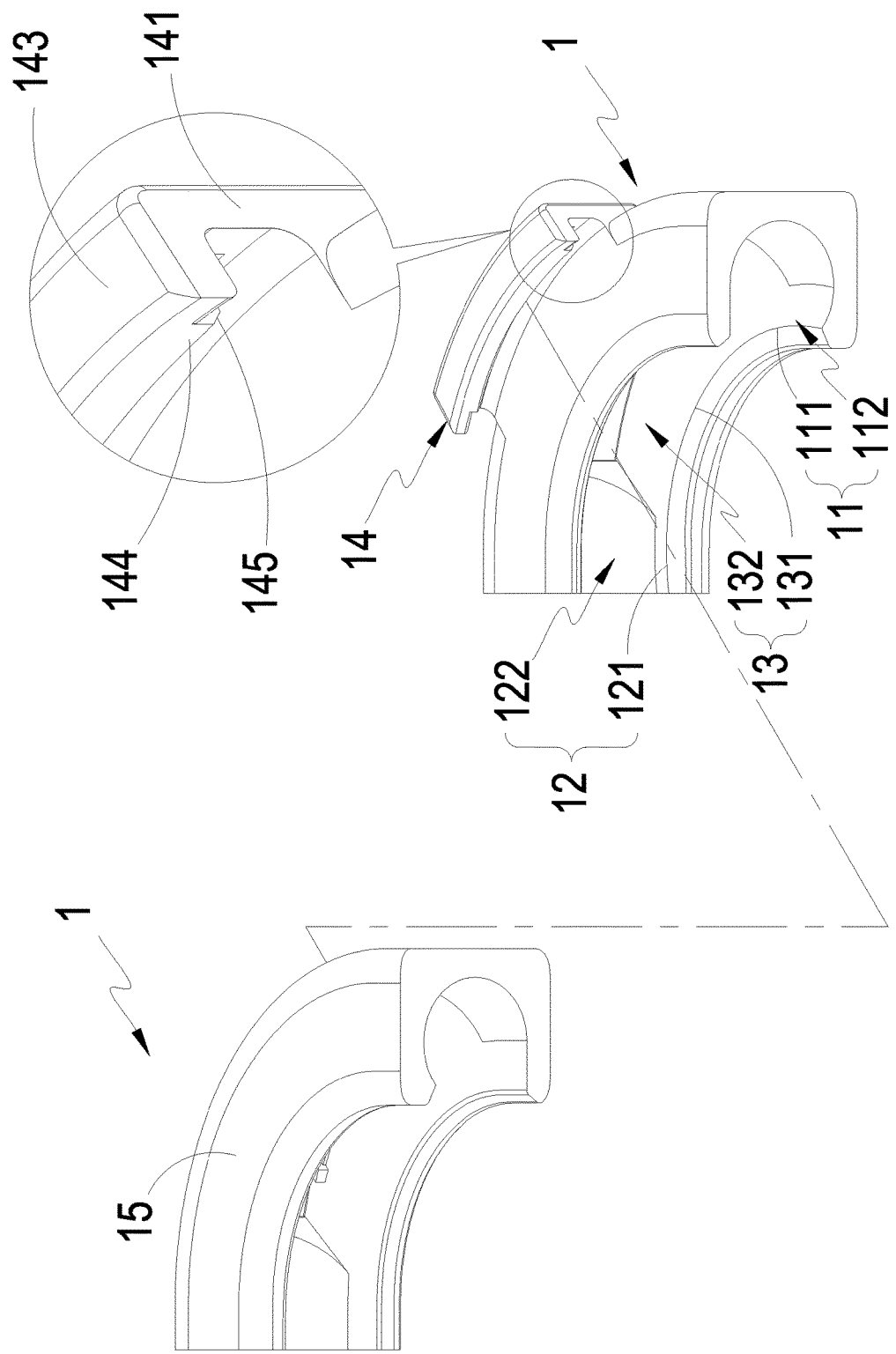
FIG. 2 is an exploded view of the pipe fixation apparatus of the present invention.
Figure 3:
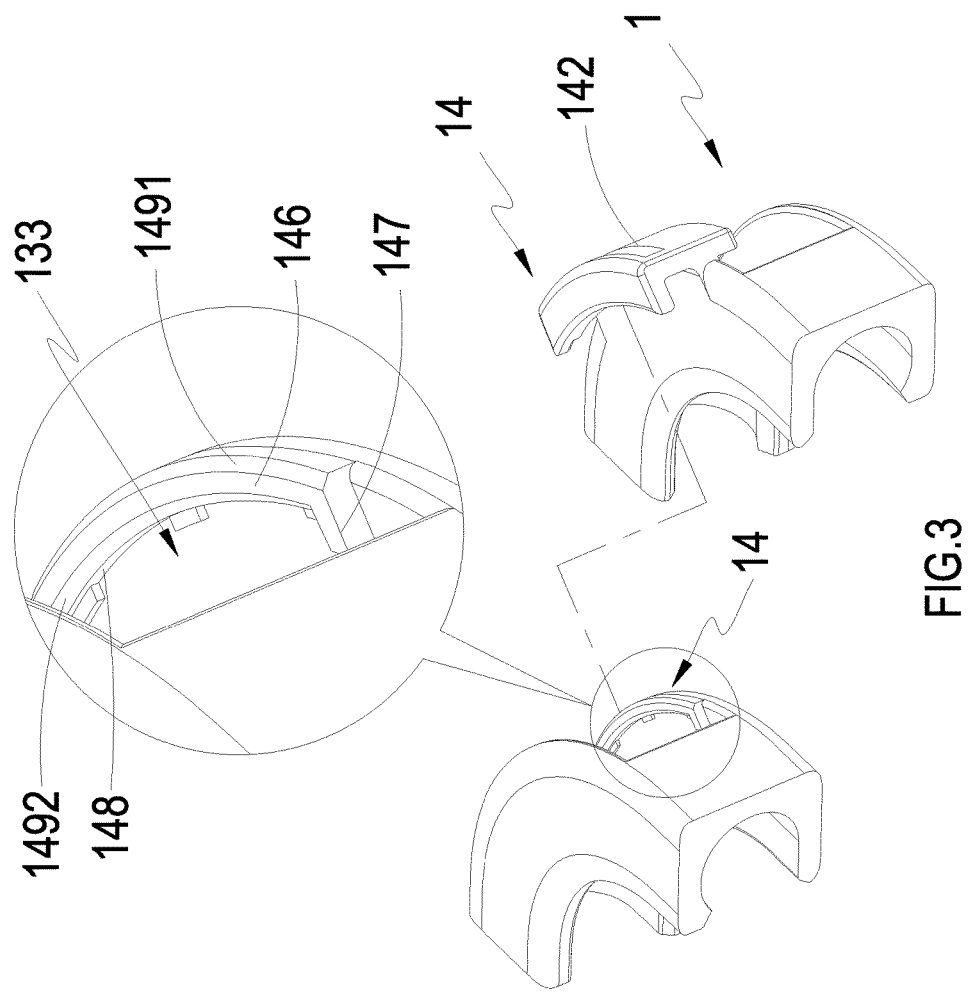
FIG. 3 is another exploded view of the pipe fixation apparatus of the present invention viewed from another angle.
Figure 4:
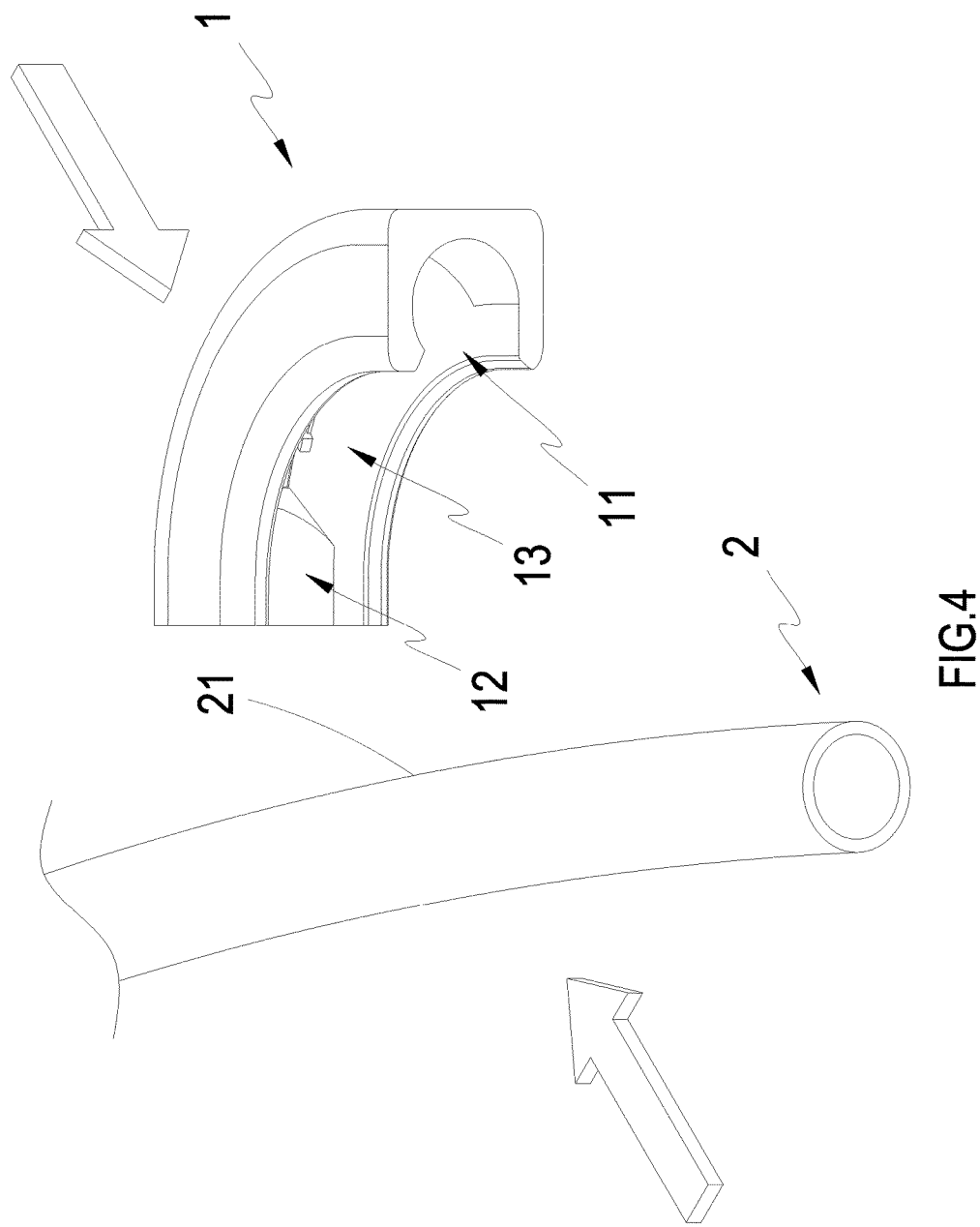
FIG. 4 is an illustration showing the placement of the pipe fixation apparatus of the present invention.
Figure 5:
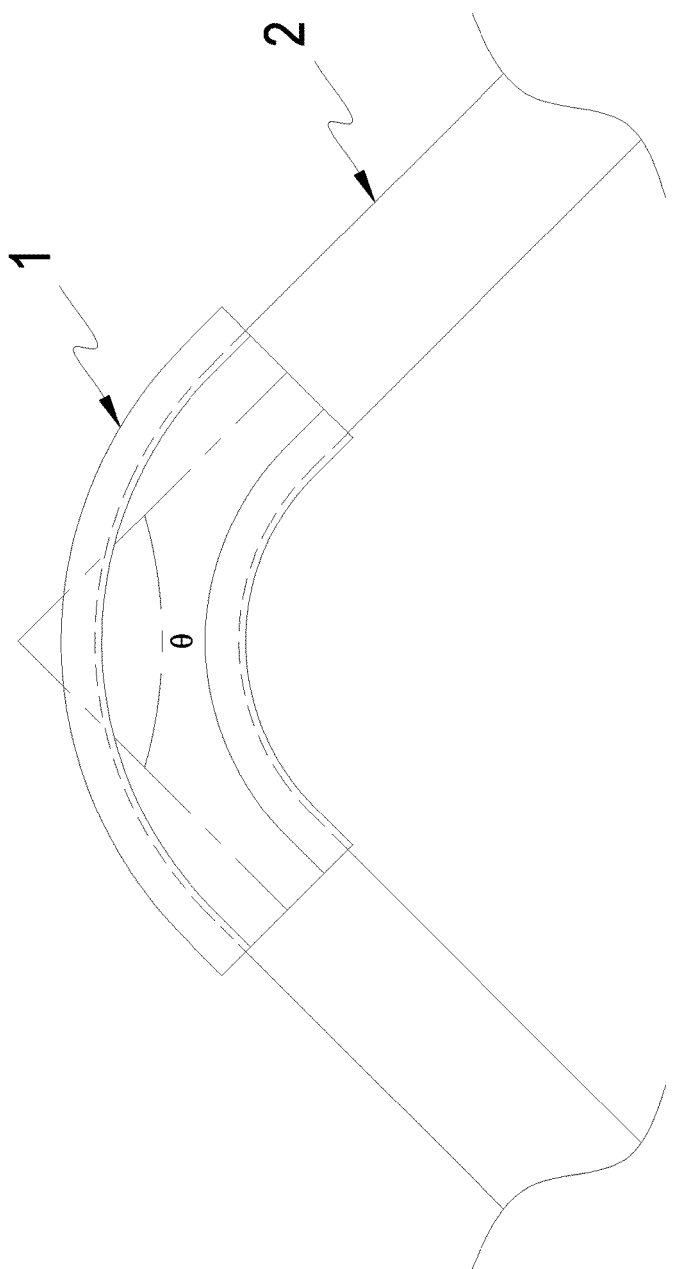
FIG. 5 is an illustration showing the bending of the pipe fixation apparatus of the present invention.

As shown in FIG. 1 to FIG. 3, according to an embodiment of a pipe fixation apparatus of the present invention, the pipe fixation apparatus comprises at least one main body 1. In this exemplary embodiment, two units of the main bodies 1 of the pipe fixation apparatus are used as an example for illustration. In addition, the main body 1 can include at least one label portion 15, and the label portion 15 comprises any one of a color, a text and a symbol thereon.

The main body 1 includes at least one first receiving portion 11 formed on one end thereof, and at least one second receiving portion 12 at another end of the main body away from the first receiving portion 11. The first receiving portion 11 and the second receiving portion 12 are configured to receive at least one pipe therein. In addition the pipe includes at least one flexible portion that can be bent in shape. Furthermore, in this exemplary embodiment of the present invention, the pipe refers to a cooling flexible pipe constituting the water cooling channel of a computer for illustration, and the pipe can be used for conveying a cooling liquid (such as clean water etc.).

In addition, the first receiving portion 11 includes at least one first fixation portion 111 formed thereon for securing the pipe, and the second receiving portion 12 includes at least one second fixation portion 121 formed thereon for securing the pipe.

The main body 1 includes at least one first bending portion 13 formed between the first receiving portion 11 and the second receiving portion. In addition, the bending portion 13 is configured to allow the first receiving portion 11 and the second receiving portion 12 to form at least one angle θ between 80 degree and 130 degree, and such angle θ is preferably to be 90 degree. Furthermore, the bending portion 13 includes at least one hollow portion 133 formed thereon, and the bending portion 13 further includes a directional fixation portion 131 formed there for securing the pipe.

The first receiving portion 11 comprises at least one first opening 112, and the second receiving portion comprises at least one second opening 122. In addition, the bending portion 13 comprises at least one bending opening 132. The first opening 112, the second opening 122 and the bending opening 132 are connected to each other in order to receive a pipe therein.

The attachment portion 14 is formed on at least one side of the main body 1. In this exemplary embodiment, two main bodies 1 having different structures of attachment portions 14 are used as an example for illustration:

One of the attachments 14 of the main body 1 includes an extension portion 141 extended in a direction away from the main body 1, at least one stress portion 142 formed on the extension portion 141, at least one hook portion 143 bent and formed on the extension portion 141 away from an end of the main body 1, at least one locking portion 144 formed on the hook portion 143 and bent to face toward a direction of the main body 1, and at least one guiding portion 145 formed on the locking portion 144 away from a side of the extension portion 141.

In addition, the attachment portion 14 of the main body 1 comprises at least one protruding rib portion 16, a plurality of blocking portions 147 formed on two ends of the protruding rib portions 146, at least one engagement portion 148 surrounded by the protruding rib portion 146 and the plurality of blocking portions 147, at least one first guiding portion 1491 formed on one side of the protruding rib portion 146, and at least one second guiding portion 1492 formed on the protruding rib portion 146 away from the first guiding portion 1491.

Accordingly, the two attachment portions 14 can be locked onto each other for fixation in order to allow the two main bodies 1 to be arranged in parallel. In addition, it can be understood that the aforementioned attachment portions 14 are provided as an example for illustrating this exemplary embodiment only, and other structures can also be used for attachment and fixation. Furthermore, the aforementioned structure is only one of possible embodiments of the present invention, and the present invention is not limited to such structure only.

Please refer to FIG. 1 to FIG. 6. A shown in the drawings, the pipe fixation apparatus of the present invention can be further configured to secure a pipe 2 having a flexible portion 21. The pipe 2 can simply be placed to be in contact with the first opening 112, the second opening 122 and the bending opening 132 in order to allow the pipe 2 to enter into the first receiving portion 11, the second receiving portion 12 and the bending portion 13. The pipe 2 is able to form a bending shape corresponding to the shape of the main body 1 (bending portion 13) of the pipe fixation apparatus of the present invention, and it is secured naturally by the first fixation portion 111, the second fixation portion 121 and the directional fixation portion 131; thereby, the pipe 2 is able to maintain a bending shape to facilitate the pipe arrangement (the bending angle θ of 90 degrees is shown as an example in the drawings for illustration). Moreover, the hollow portion 133 can be provided to allow the pipe 2 and the flexible portion 21 thereof to protrude out of the main body 1 in order to facilitate the bending of the pipe 2 and the flexible portion 21 thereof.

Figure 6:
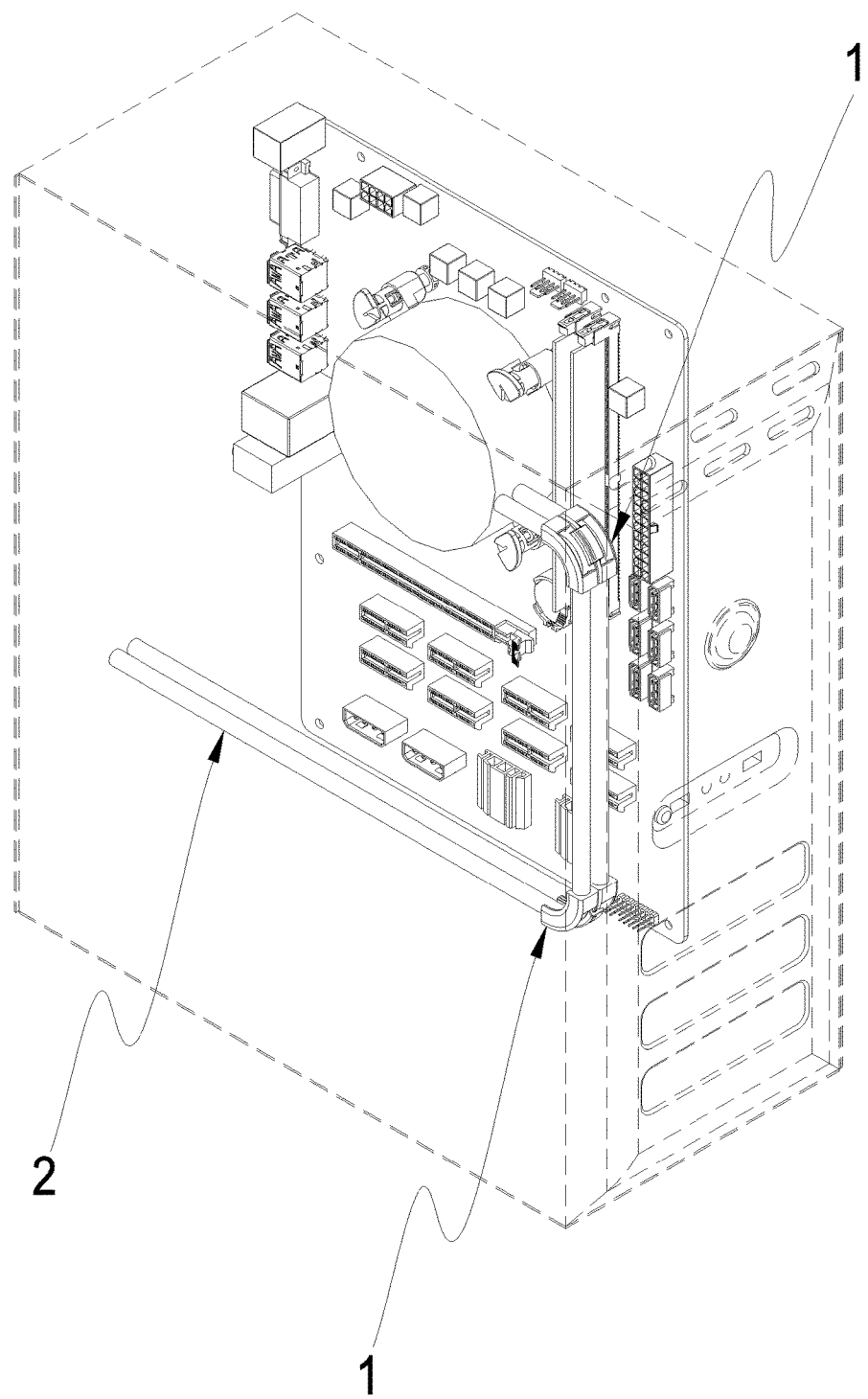
FIG. 6 is an illustration showing a state of use the pipe fixation apparatus of the present invention.

As shown in FIG. 6, an example where 2 pipes are secured is illustrated. The two main bodies 1 are arranged onto two pipes 2, and the two attachment portions 14 can be attached with each other for fixation in order to allow the two main bodies 1 to be attached with each other in parallel. During the attachment and fixation, only the two attachment portions 14 are required to be in contact with and abutted against each other. The extension portion 141 is able to use the stress portion 142 to form a through hole structural design in order to achieve the preferred effect of elastic deformation. Consequently, the hook portion 143 and the locking portion 144 are able to cross over the rib portions 146 easily; in addition, with the design of the guiding portion 145 and the inverted angle of the first guiding portion 1491, the cross-over thereof is further facilitated. Next, the extension portion 141 is able to generate elastic restoration to allow the locking portion 144 to engage with the engagement portion 148. Furthermore, the blocking portion 147 is able to assist the fixation of the two ends of the locking portion 144 in order to prevent accidental lease thereof; therefore, the two pipes 2 can be arranged neatly in parallel. As a result, the pipe fixation apparatus of the present invention is able to conveniently and swiftly secure the pipes 2 and to allow the pipes 2 to maintain the bending shapes, which facilitates the arrangement of the pipes and provides a neat and appealing appearance for subsequent computer maintenance etc. In addition, other auxiliary parts (such as cable tie etc.) can be used to attach computer parts with the pipes 2 in order to provide further aids in securing the locations of the pipes. Moreover, when there is a need to detach the two main bodies 1, the design of the inverted angle of the second guiding portions 1492 is able to allow the locking portion 144 to disengage from the engagement portion 148 with ease.

Accordingly, the pipe fixation apparatus of the present invention can be arrange corresponding to a pipe 2 having a flexible portion 21 and is able to overcome the drawback associated with the use of linear rigid pipes and angled connectors as well as overcome the drawback of high costs of known arts by reducing the manufacturing cost thereof.

Figure 7:
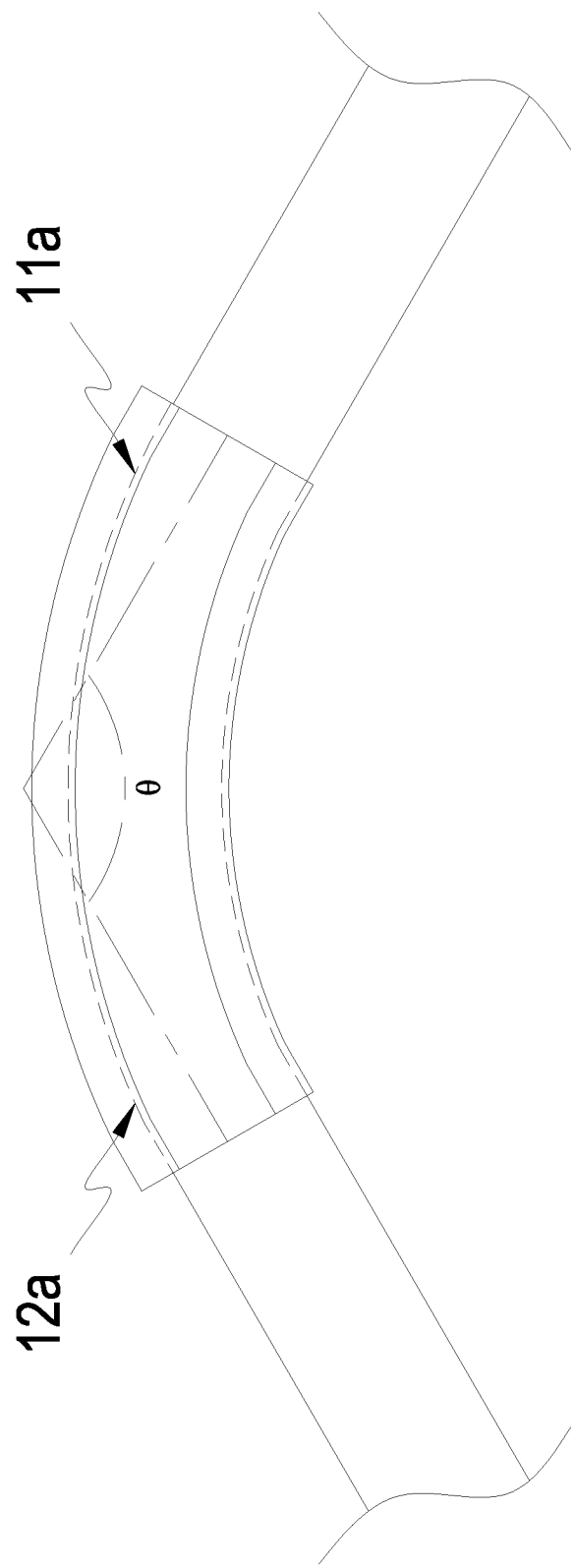
FIG. 7 is an illustration showing a state of use of another embodiment of the pipe fixation apparatus of the present invention.

Please refer to FIG. 7. As shown in the drawing, it can be understood that the main difference relies in that in this exemplary embodiment, the angle θ of 120 degrees formed between the first receiving portion 11a and the second receiving portion 12a is used as an example for illustration. It clearly demonstrates that the pipe fixation apparatus of the present invention can have a diverse variation and is not limited to the exemplary configurations or structures described only.

Figure 8:
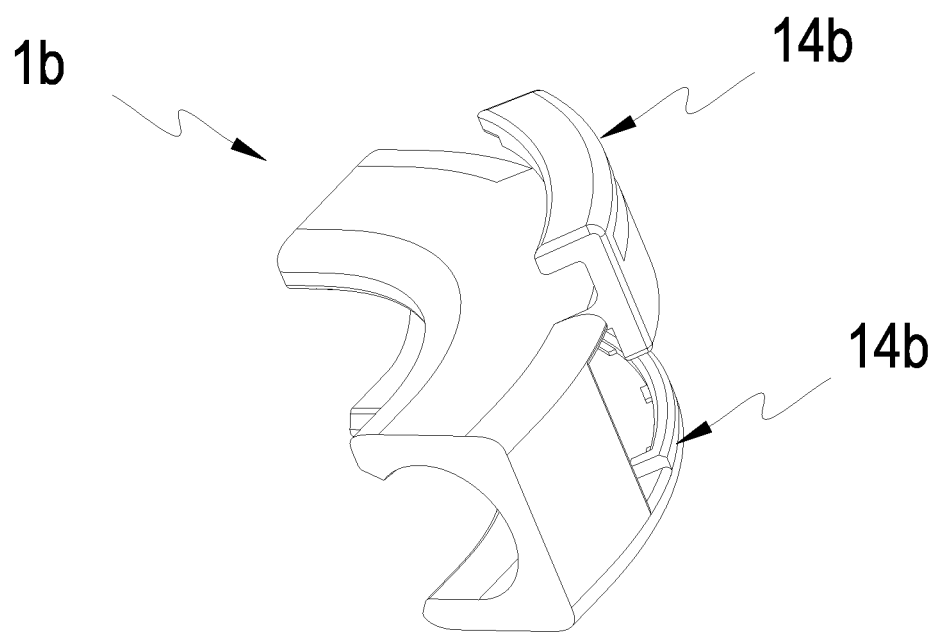
FIG. 8 is an illustration showing a structure of another embodiment of the pipe fixation apparatus of the present invention.
Figure 9:
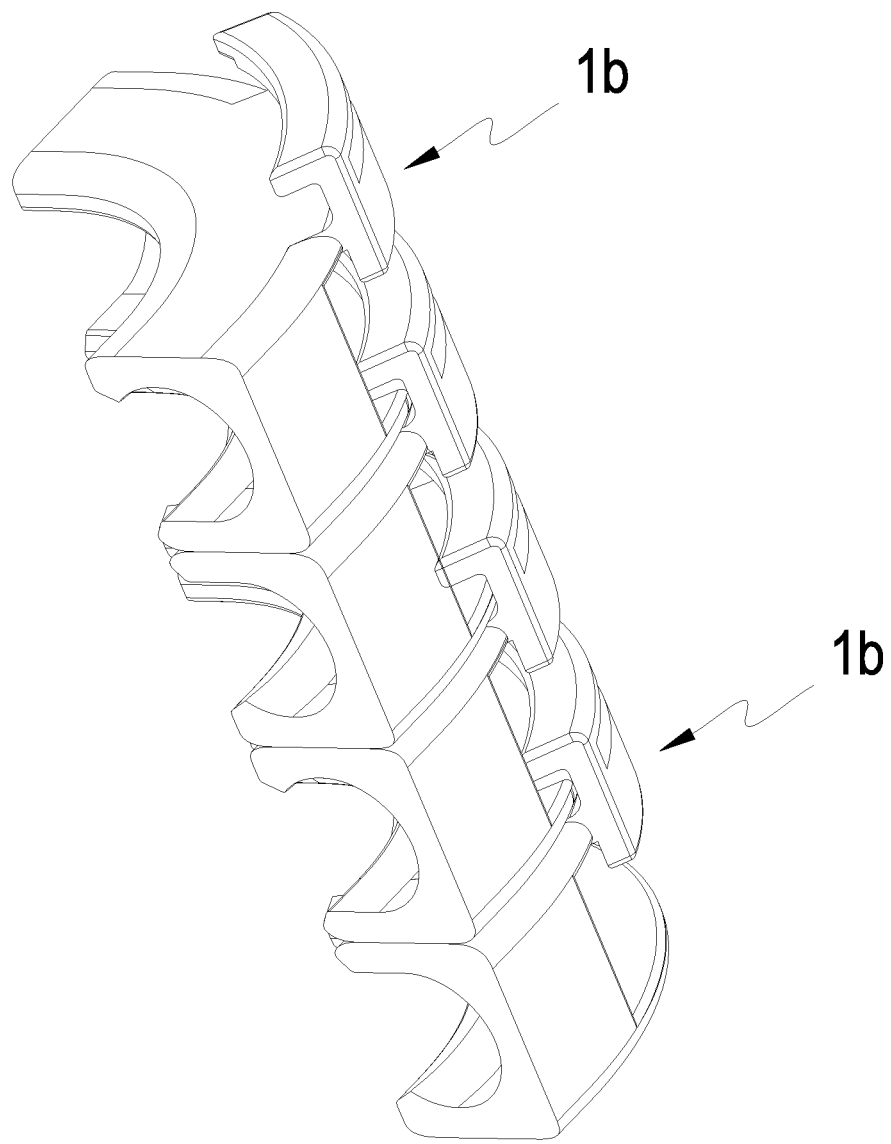
FIG. 9 is an illustration showing a plurality of the pipe fixation apparatus of the present invention connected with each other.

Please refer to FIG. 8 and FIG. 9. As shown in the drawings, it can be understood that the difference relies in that in this exemplary embodiment, one single main body 1b having two opposite sides formed of at least one attachment portion 14*b* respectively thereon is used as an exemplary embodiment for illustration, Accordingly, when the quantity of main body 1*b* is plural, they can be connected in parallel with each other in order to allow the use thereof to be of greater diversity.

I claim:

1. A pipe fixation apparatus, comprising:
   at least one main body;
   at least one first receiving portion formed at one end of the main body for receiving at least one pipe therein;
   at least one first fixation portion formed on the first receiving portion for securing the pipe thereon;
   at least one second receiving portion formed on one end of the main body away from the first receiving portion for receiving the pipe therein;
   at least one second fixation portion formed on the second receiving portion for securing the pipe thereon; and
   at least one bending portion formed on the main body and arranged between the first receiving portion and the second receiving portion, and configured to form at least one angle between the first receiving portion and the second receiving portion in order to allow the pipe to have a bending shape when the pipe is secured by the first fixation portion and the second fixation portion; and at least one attachment portion formed on at least one side of the main body;
   wherein the attachment portion comprises at least one extension portion extended in a direction away from the main body, at least one stress portion formed on the extension portion, at least one hook portion bent and formed on the extension portion away from an end of the main body, at least one locking portion formed on the hook portion and bent to face toward a direction of the main body, and at least one guiding portion formed on the locking portion away from a side of the extension portion; the attachment portion comprises at least one protruding rib portion, a plurality of blocking portions formed on two ends of the protruding rib portions, at least one engagement portion surrounded by the protruding rib portion and the plurality of blocking portions, at least one first guiding portion formed on one side of the protruding rib portion, and at least one second guiding portion formed on the protruding rib portion away from the first guiding portion.

2. The pipe fixation apparatus according to claim 1, wherein the first receiving portion comprises at least one first opening, and the second receiving portion comprises at least one second opening; the bending portion comprises at least one bending opening; the first opening, the second opening and the bending opening are connected to each other in order to receive the pipe therein.

3. The pipe fixation apparatus according to claim 1, wherein the bending portion includes at least one directional fixation portion, and the directional fixation portion is configured to cooperate with the first fixation portion and the second fixation portion to secure the pipe to form a bending shape.

4. The pipe fixation apparatus according to claim 1, wherein the bending portion includes at least one hollow portion formed thereon in order to facilitate the pipe to form a bending shape.

5. The pipe fixation apparatus according to claim 1, wherein the bending portion is configured to allow the first receiving portion and the second receiving portion to form an angle between 80 degree sand 130 degrees.

6. The pipe fixation apparatus according to claim 1, wherein the pipe includes at least one flexible portion formed thereon.

7. The pipe fixation apparatus according to claim 1, wherein the main body includes at least one label portion, and the at least one label portion is selected from the group consisting of a color, a text and a symbol.

\* \* \* \* \*